United States Patent
Graf

[19]

[11] Patent Number: 6,128,564
[45] Date of Patent: Oct. 3, 2000

[54] CONTROLLER FOR A DRIVE TRAIN OF A MOTOR VEHICLE

[75] Inventor: Friedrich Graf, Regensburg, Germany

[73] Assignee: Siemens Aktiengesellschaft, Munich, Germany

[21] Appl. No.: 09/104,506

[22] Filed: Jun. 25, 1998

[30] Foreign Application Priority Data

Jun. 25, 1997 [DE] Germany ............................ 197 27 044

[51] Int. Cl.[7] ................................................ G06F 17/00
[52] U.S. Cl. ................................ 701/51; 701/53; 701/54; 477/102; 477/107; 477/109
[58] Field of Search .................. 701/51, 52, 53, 701/54, 57; 477/109, 110, 107, 102, 33, 93, 98, 155

[56] References Cited

U.S. PATENT DOCUMENTS

| | | | |
|---|---|---|---|
| 4,819,187 | 4/1989 | Yasue et al. ............................. | 701/54 |
| 4,945,481 | 7/1990 | Iwatsuki et al. ......................... | 701/54 |
| 5,025,380 | 6/1991 | Wataya et al. .......................... | 701/104 |
| 5,228,368 | 7/1993 | Kato et al. ............................... | 477/33 |
| 5,307,270 | 4/1994 | Graf ......................................... | 701/54 |
| 5,323,667 | 6/1994 | Tweed et al. ............................ | 477/107 |
| 5,335,568 | 8/1994 | Kammerl et al. ....................... | 477/109 |
| 5,369,584 | 11/1994 | Kajiwara ................................. | 701/48 |
| 5,396,420 | 3/1995 | Graf ......................................... | 701/55 |
| 5,421,305 | 6/1995 | Tomisawa ............................... | 123/435 |
| 5,547,434 | 8/1996 | Graf et al. ............................... | 477/109 |
| 5,749,060 | 5/1998 | Graf et al. ............................... | 701/51 |
| 5,822,708 | 10/1998 | Wagner et al. .......................... | 701/54 |
| 5,997,434 | 12/1999 | Graf et al. ............................... | 477/98 |
| 6,026,342 | 2/2000 | Graf et al. ............................... | 701/51 |

FOREIGN PATENT DOCUMENTS

| | | |
|---|---|---|
| 0 342 643 | 11/1989 | European Pat. Off. . |
| 0 518855 B1 | 9/1991 | European Pat. Off. . |
| 2934477 C3 | 10/1987 | Germany . |
| 2935916 C2 | 12/1989 | Germany . |

OTHER PUBLICATIONS

German Published Non-Prosecuted Application DE 40 37 092 A1 (Runge W. et al.), dated May 27, 1992.
International Publication WO 91/13780 (Graf, F.), dated Sep. 19, 1991. Abstract.

*Primary Examiner*—Jacques H. Louis-Jacques
*Attorney, Agent, or Firm*—Herbert L. Lerner; Laurence A. Greenberg; Werner H. Stemer

[57] ABSTRACT

The invention relates to a drive train controller of a motor vehicle which has an engine and an automatic transmission. The drive train controller has an engine controller for controlling variables affecting engine torque and a transmission controller for controlling shifting events of an automatic transmission. There is an interface interconnecting the transmission controller and the engine controller for allowing constant communications between the transmission controller and the engine controller. The transmission controller transmits a correction term $M_{kor}$ to the engine controller over the interface for controlling a magnitude of the engine torque. The transmission controller transmits a time constant to the engine controller via the interface for controlling the dynamic behavior of the engine torque. In this manner, the transmission shifts smoothly between gears.

6 Claims, 5 Drawing Sheets

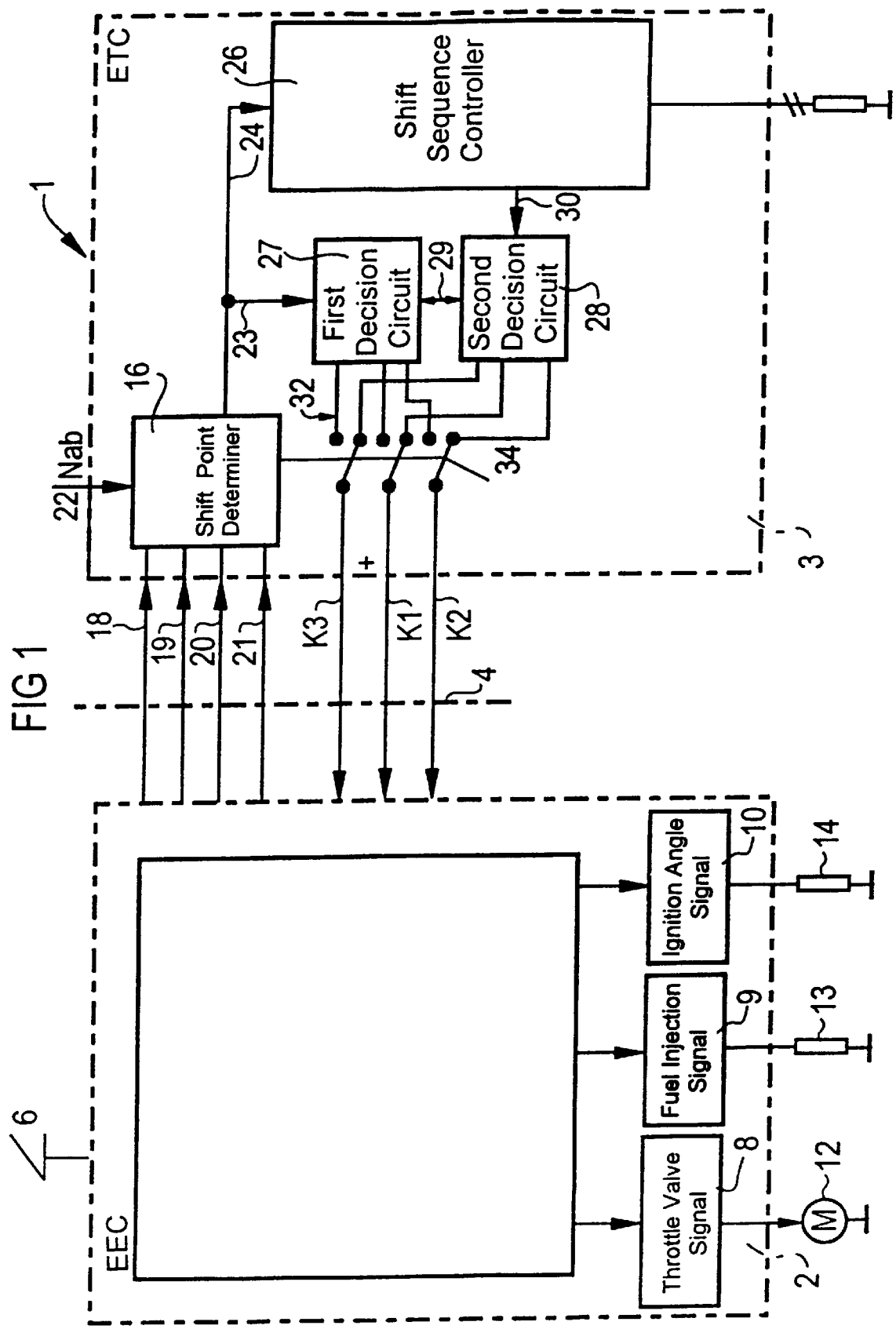

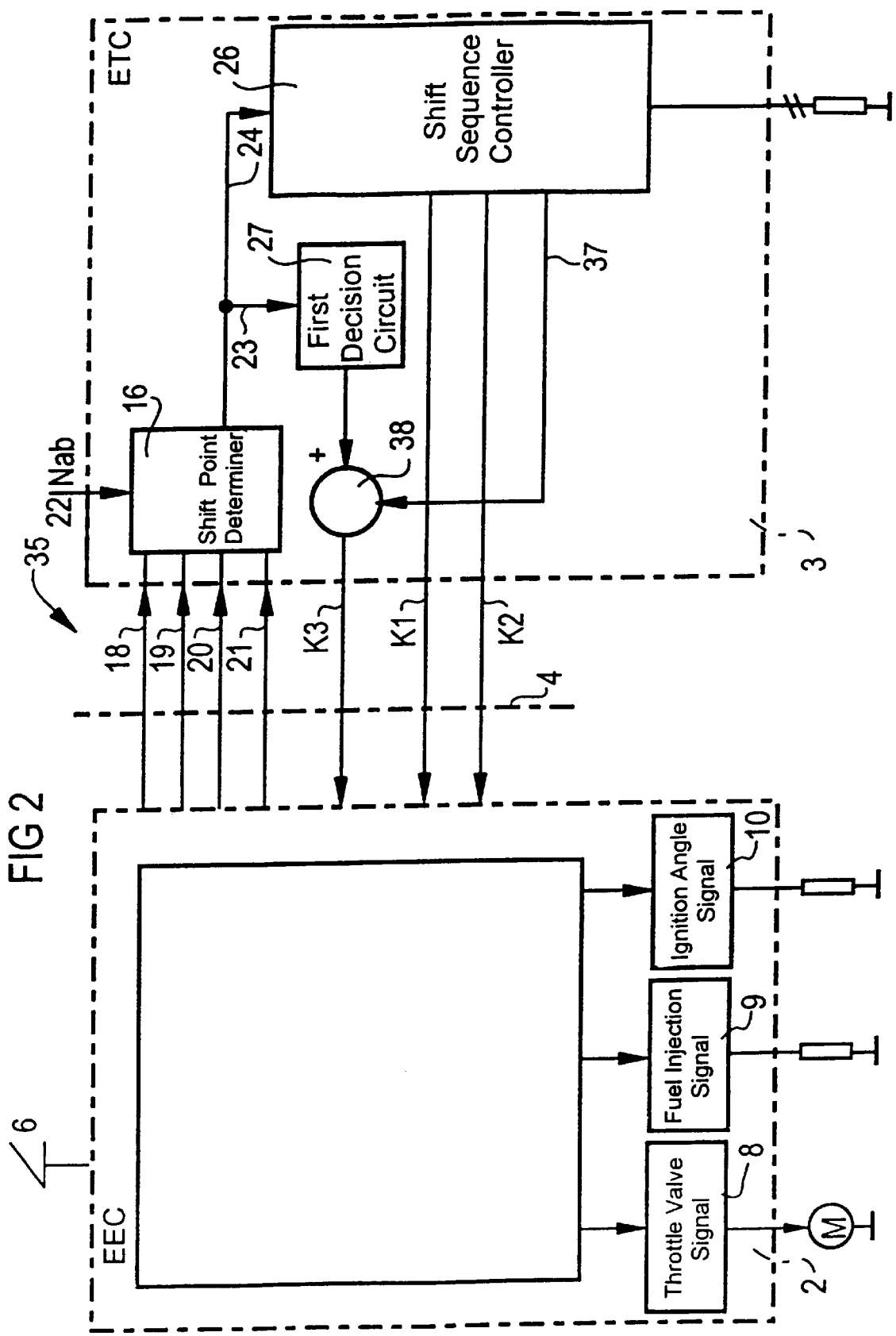

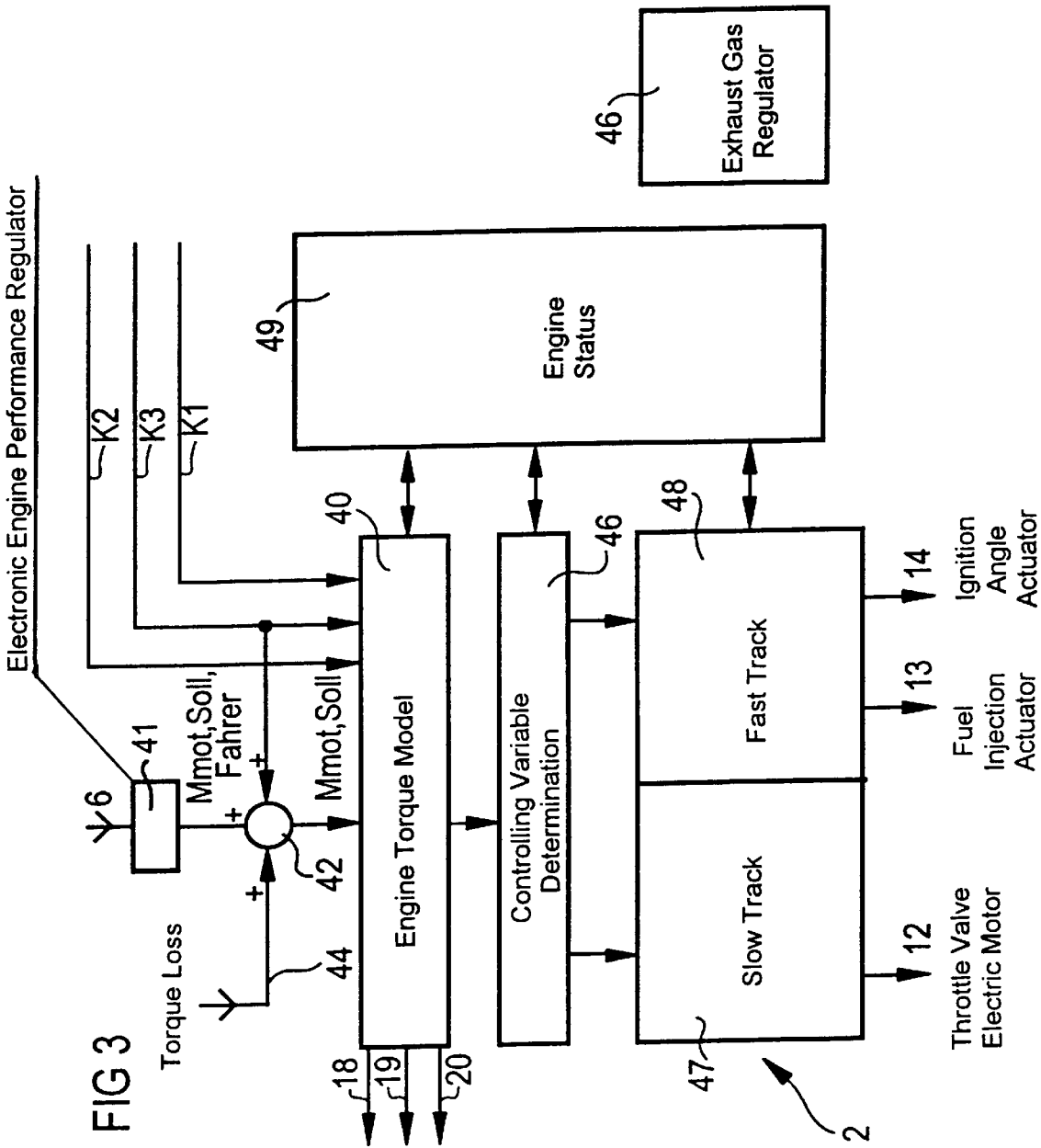

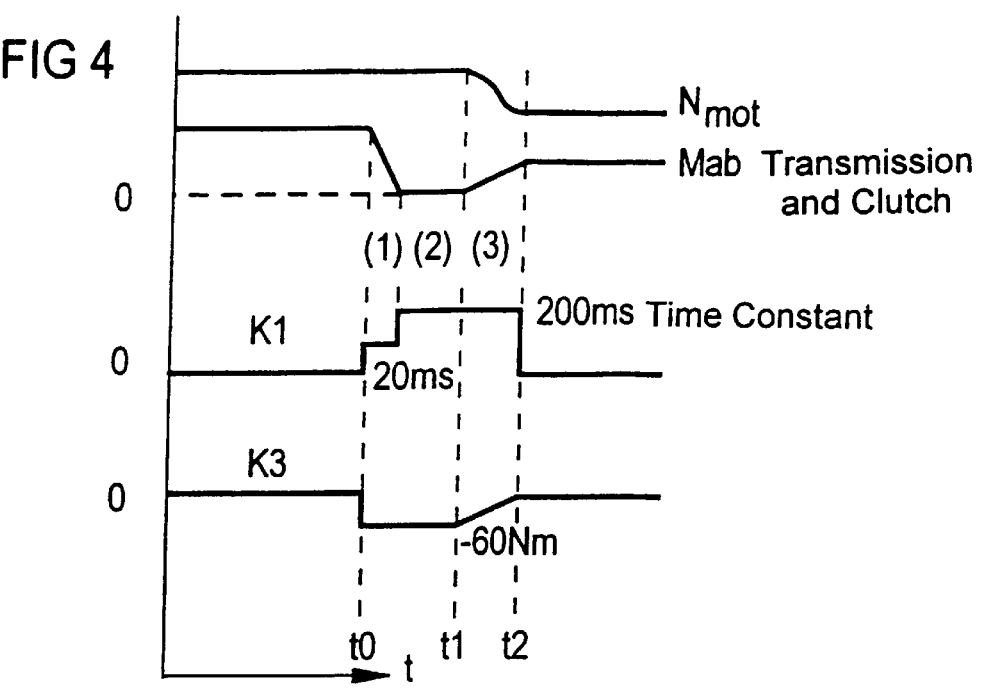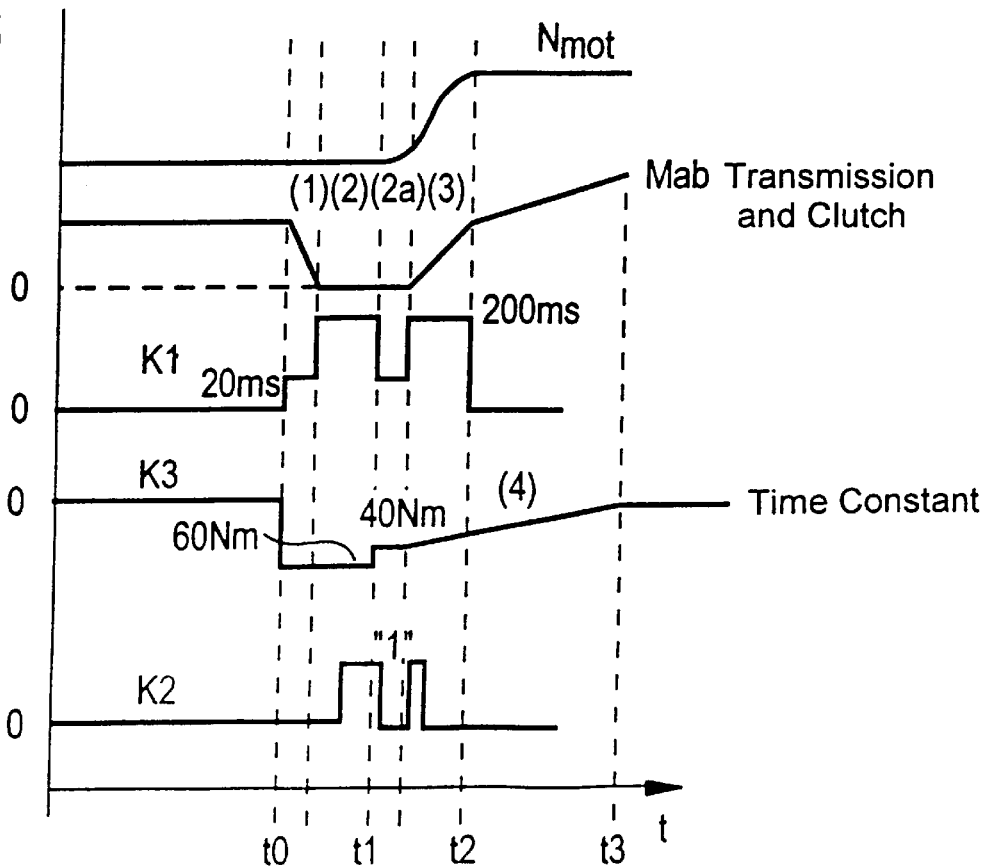

CONTROLLER FOR A DRIVE TRAIN OF A MOTOR VEHICLE

BACKGROUND OF THE INVENTION

Field of the Invention

The invention relates to a controller for a drive train of a motor vehicle. The drive train controller includes an engine controller for controlling variables affecting engine torque, a transmission controller for controlling shifting events of an automatic transmission, and an interface interconnecting the transmission controller and the engine controller for allowing constant communications between the transmission controller and the engine controller.

Conventional transmission and engine controllers reduce engine torque by varying the ignition angle. The object being to make smoother gear shifts resulting in a more comfortable ride and to reduce the stress on the transmission. Such an engine and transmission controller pair is described in German Patents Nos. 29 35 916 C2 and 29 34 477 C3. The object is achieved in standard automatic transmissions of the conventional kind which generally include a planetary gear sets. The transmission controller transmits a relative amount of torque reduction, in accordance with which the ignition angle of the engine is retarded.

A similar system is known from Non-Prosecuted, Published German Patent Disclosure No. 40 37 092 A1. To improve the control of the entire drive unit, computer systems of the transmission controller and the engine controller are connected to one another so that they constantly communicate, via interfaces. In this way, the transmission controller sends a percentage-wise torque demand to the engine controller in a cyclical time cadence, and on the basis of this the engine controller automatically influences the engine torque.

In another known drive train controller, the transmission controller transmits a signal by which the (uncorrected) engine torque, which is present at the input shaft of the transmission, should be proportionally varied to the engine controller. The uncorrected engine torque is known to the transmission controller, because the transmission controller either calculates it itself or receives it from the engine controller via a communication line. Such a system is described in European Patent Disclosure No. 0 518 855 B1. The transmission controller need not contain any engine-specific data in order to convert a torque reduction into an ignition intervention, or an intervention into the injection or the valve control. The conversion takes place in the engine controller. This considerably reduces the needed number of variant forms of the transmission controller.

SUMMARY OF THE INVENTION

It is accordingly an object of the invention to provide a controller for a drive train of a motor vehicle which overcomes the above-mentioned disadvantages of the prior art devices, in which only requisite physically dimensioned descriptive variables that affect engine torque reduction have to be exchanged between the transmission controller and the engine controller. The transmission controller defines the engine system behavior on the basis of a generalized model. The model describes the behavior demanded by the transmission controller at the system boundaries between the engine and the transmission (engine power takeoff shaft) unambiguously, without regard to the technical realization in the engine system. The practical execution of an engine intervention is the sole responsibility of the engine controller. The engine controller defines whether an ignition intervention should be made, whether the quantity of injected fuel should be reduced, whether the valve control times or valve characteristics should be varied, or whether the engine should be controlled via the throttle valve. The engine controller also controls by itself all of the actuators required for these purposes.

The advantages of the invention are above all the complete independence of the transmission controller from the particular engine controller used, and the resultant freedom in combining them. Therefore, the number of variants of the transmission controller is reduced to a minimum number.

With the foregoing and other objects in view there is provided, in accordance with the invention, a drive train controller of a motor vehicle having an engine and an automatic transmission, the drive train controller includes: an engine controller for controlling variables affecting engine torque; a transmission controller for controlling shifting events of an automatic transmission; an interface interconnecting the transmission controller and the engine controller for allowing constant communications between the transmission controller and the engine controller; the transmission controller transmits a correction term $M_{kor}$ to the engine controller over the interface for controlling a magnitude of the engine torque; and the transmission controller transmits a time constant to the engine controller via the interface to control the dynamic behavior of the engine torque.

In accordance with an added feature of the invention, the time constant transmitted by the transmission controller defines the engine torque outside a shifting event.

In accordance with an additional feature of the invention, the correction term $M_{kor}$ transmitted by the transmission controller increases the engine torque after shifting as a function of a driving situation wherein a power takeoff torque of the transmission after shifting is approximately equal to the power takeoff torque before shifting.

In accordance with another feature of the invention, the interface interconnecting the engine controller and the transmission controller has a first channel for transmitting data specifying a type of engine intervention, and a second channel for transmitting data dimensioning an amplitude of the engine intervention.

In accordance with a further added feature of the invention, the interface interconnecting the engine controller and the transmission controller has a first channel for transmitting data parameterizing an engine intervention of a predetermined type, and a second channel transmitting data dimensioning an amplitude of the engine intervention.

In accordance with a concomitant feature of the invention, the interface interconnecting the engine controller and the transmission controller has a third channel for transmitting data activating the engine intervention in a preparatory fashion.

Other features which are considered as characteristic for the invention are set forth in the appended claims.

Although the invention is illustrated and described herein as embodied in a controller for a drive train of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram of a first embodiment of a drive train controller according to the invention;

FIG. 2 is a block diagram of a second embodiment of the drive train controller;

FIG. 3 is a block diagram of an engine controller of the drive train;

FIGS. 4–6 are graphs of a course over time of operating variables of a motor vehicle and control signals transmitted in the drive train controller;

DESCRIPTION OF THE PREFERRED EMBODIMENTS

Figure 6:
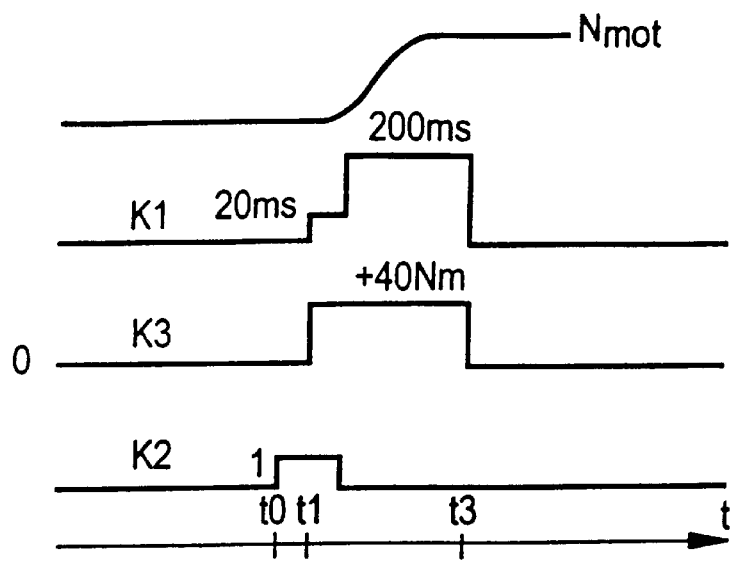

Referring now to the figures of the drawing in detail and first, particularly, to FIG. 1 thereof, there is shown a drive train controller 1 of a motor vehicle which includes an electronic engine controller (EEC for short) 2 and an electronic transmission controller (ETC) 3. The EEC 2 and the ETC 3 communicate with one another over an interface 4 by exchanging data on operating variables of the motor vehicle as well as control signals, in particular in the form of physical descriptive variables.

The engine controller 2 receives signals from an accelerator pedal 6 and provides three output control signals. A signal output 8 for the throttle valve, a signal output 9 for the fuel injection, and a signal output 10 for controlling the ignition angle of an engine of a motor vehicle. Via the signal output 8, an electric motor 12 that actuates the throttle valve of the motor vehicle is controlled. Via the signal outputs 9 and 10, actuators 13 and 14, which by way of example are embodied as piezoelectric or inductive actuators, are controlled. The actuators 13, 14 adjust the fuel quantity to be injected and the engine ignition angle, respectively.

The transmission controller 3 includes the following components: a shifting point determiner 16, which receives data about various values of the engine torque (also called engine moment) from the engine controller 2 over lines 18, 19 and 20. Via a line 21, it receives information on the desired driver-specified desired engine torque $M_{mot,soll,fahrer}$, or on the accelerator pedal position FP. Via a line 22, the shifting point determiner 16 receives the applicable power takeoff rpm of the transmission $N_{ab}$, which corresponds to the wheel rpm and thus—in a predetermined ratio—to the speed of the motor vehicle. Via a branching signal line 23, 24, the shifting point determiner 16 sends a shifting command to a shift sequence controller 26 and to a first decision circuit 27 as well as a second decision circuit 28. These two decision circuits 27, 28 are connected to one another by a bidirectional line 29. The shift sequence controller 26 sends control signals to the second decision circuit 28 over a line 30.

Three signal outputs from each of the first and second decision circuits 27, 28 are connected via signal lines 32 to terminals of a switch 34. The switch 34 controlled by the shifting point determiner 16 connects the outputs of either the first decision circuit 27 or the second decision circuit 28 with three signal lines or channels K1, K2 and K3 of the interface 4 that connects the transmission controller 3 to the engine controller 2. The switch 34 is controlled or switched over by the shifting point determiner 16. The line 21 and the lines 18–20, if present, are also elements of the interface 4. The switch 34 may also be realized in the engine controller 2, or in a common drive train controller that contains both the engine controller 2 and the transmission controller 3, an option not shown in the drawing here.

In a second exemplary embodiment of a drive train controller 35 of the invention, the second decision circuit 28 and the switch 34 are replaced by an adder or summation point 38 (FIG. 2). Two of the outputs of the shift sequence controller 26 are connected directly to the first channel K1 and to the second channel K2 of the interface 4. A third output of the shift sequence controller 26 is connected by a line 37 to one input of the adder 38. The output of the first decision circuit 27 is connected to the other input of the adder 38. The shift sequence controller 26, via the line 37, the adder 38 and the channel K3, transmits the amplitude or intensity of the adjustment of the engine torque to the engine controller 2.

The adder 38 may also be realized in the engine controller 2 or in a common higher-ranking drive train controller. The drive train controller 35 is simpler than the exemplary embodiment shown in FIG. 1. However, no switchover is possible between the two operating modes called "do not shift" (first decision circuit 27) and "shift" (second decision circuit 28). All of the other components of the drive train controller 35 correspond to those of the drive train controller 1 and therefore have the same reference numerals.

The engine controller 2 is shown in FIG. 3 in the form of function blocks. What is essential for communication with the transmission controller 3 is a function block called "engine torque model" 40. The engine torque model 40 receives over the lines K1–K3 the physical descriptive variables that the transmission controller 3 generates, without knowing any details regarding the engine controller 2, and which on the other hand along with the wishes or commands of the driver input via the accelerator pedal 6 suffice for controlling the engine. Over the lines 18–20, the engine torque model 40 transmits the data on the engine torque that the transmission controller 3 requires for its operation and for its cooperation with the engine controller 2. The accelerator pedal 6, in advanced drive train controllers, no longer acts directly on the throttle valve but instead is connected to an electronic engine performance regulator 41. The electronic engine performance regulator 41 detects the driver's desired torque $M_{mot,soll,fahrer}$.

In a summation point or adder 42, the output signal of the engine performance regulator 41 is combined with the torque loss, transmitted over a line 44, for instance from a performance graph and a dimensioning, transmitted by the transmission controller over the channel K3, of an engine intervention (which will be addressed in detail hereinafter) and the combined signal is transmitted as the desired engine torque $M_{mot,soll}$ to the engine torque model 40.

Connections with driving dynamic controllers (ABS, TCS, VDS) also take place in the function block 40 (again on the basis of a requested influence on the engine torque, but these will not be discussed further here). The output signal of the function block 40 is transmitted to a function block called controlling variable determination 46, in which a decision is made as to how the adjustment of the engine torque will be converted. Accordingly, the output signals of the controlling variable determination 46 are transmitted either to a function block called "slow track" 47 and from there to the electric motor 12 of the throttle valve, or to a function block called "fast track" 48 and from there to the actuators 13 for the injection time and to the final control element 14 for the ignition angle (in the case of an Otto engine). The two tracks behave in coordination with one another, both in operation not involving any external interventions and when there are demands from external units such as the transmission controller. Which, for instance, enables producing exhaust emissions as low as possible at all times (in contrast to external interventions, which influence directly determined actuators).

A function block 49 represents the engine status and receives information from a number of sensors and final control elements, which are not shown here because they are known, exchanges data with the engine torque model function block 40, the controlling variable determination function block 41, and the functions blocks 47 and 48. The engine controller 2 is also influenced by an exhaust gas regulator 46, which is of no further interest in the present context.

The function of the drive train controllers 1 and 35 will now be explained in detail, with the aid of the graphs in FIGS. 4–8. As already noted, the transmission controller 3 need not contain any engine-specific data in order to convert a requested torque reduction, for instance, into an ignition intervention. The ignition intervention (hereinafter called method A) is then communicated to the engine controller 2. Because of the influences of ignition intervention on the exhaust gas composition and temperature (the latter is increased), it can be considered for only a limited period of time; moreover, it allows only a reduction of the engine torque, but not an increase. On the other hand, its response time is very fast.

Additional types of intervention are as follows:
a reduction in the injection quantity (including the Diesel engine) ranging to the extent of cylinder shutoff (method B);
a variation in the valve control timing and/or characteristics (inlet or injection valves), this is an alternative for influencing the engine performance and thus the engine torque for the throttle valve (method C); and
influencing the engine via the throttle valve (for the Otto engine) (method D).

Methods B and D are somewhat slower than the ignition intervention (in D, a response occurs after about 200 ms), but in return the potential depth of intervention (adjustment range) is greater, and with it the engine torque can also be increased, if necessary. The transmission states appropriate for such engine interventions will be described further hereinafter. Since the engine controller 2 has no information available on the transmission status, it is expedient if the transmission controller 3 specifies the type of intervention, because it can define the dynamics, duration and intensity (under some circumstances in preparatory form) required for that purpose. This is done by use of additional data ("specification of the intervention"), which are transmitted by the transmission controller 3 to the engine controller 2 over the information channel K1 (FIGS. 1–3) and which (alternatively) include the following information:

In a first alternative, the specification of the transmission behavior of the engine controller/engine system between the interface with the engine controller 2 and the output shaft of the engine, specifically in the form of a known closed-loop control technology structure, for instance a first order filter with a defined time constant (model-based). In this form, the filter type can also be defined. In that case, the transmission controller 3 transmits information on the time constant $\tau$ of the filter. This means that a fast intervention is parameterized (that is, defined or encoded) via a low time constant, which must accordingly not be exceeded by the engine controller/engine system.

For examples: $\tau=20$ ms=>EEC activates ignition intervention;
$\tau=200$ ms=>EEC activates throttle valve intervention.

In a second alternative, the transmission controller 3 may also specify the type of intervention directly, specifically by methods A-C, including ignition intervention.

The advantage of the (behavior model-based) first alternative resides in a certain freedom of decision in the choice of intervention means made by the engine controller 2. This is useful if the transmission system is combined with a plurality of engine types, which—for technical reasons—do not have uniform intervention types (for examples: gasoline and diesel engines).

The standard case of engine intervention on the part of the transmission has already been explained. Because of technical innovations and increasingly stringent environmental requirements (reduction of pollutant emissions and fuel consumption), novel solutions are needed in which improved cooperation of the engine and transmission is required. An example being an automatic/manual-shift transmission (ASG). When changing gears with the ASG, in principle, an interruption of the traction force occurs. If the engine torque remains unchanged, then it is "utilized" to increase the engine rpm $W_{mot}$:

$$M_{mot} = J_{mot} * \frac{dw_{mot}}{dt} \qquad (I)$$

in which $J_{mot}$ is the moment of inertia at the engine crankshaft.

Since gear changes in the ASG takes longer under some circumstances and requires a great intervention depth, the ignition intervention is expedient only at the beginning of the shifting event. After that, a transition to another type of intervention is made, such as a throttle valve intervention (method D), in order to avoid increasing emissions (nitrogen oxides) in the event of an extreme ignition intervention.

FIG. 4 illustrates the relationship during shifting where the transmissible torque of the transmission decreases to zero. In FIG. 4, the engine rpm $N_{mot}$, the pot moment (of the transmission and the clutch) $M_{ab}$, and the control signals transmitted over the interface lines or channels K1 and K3 are plotted as a function of time.

To prevent engine "racing", the engine intervention is specified by the transmission controller 3 over a channel K1 (see FIG. 1 or FIG. 2) and dimensioned over channel 3 (by specification of the torque by which the instantaneous engine output moment is to be reduced). The goal is to adapt the actual engine torque to the transmissible transmission or clutch input moment.

It can be seen that in the first phase of shifting, a rapid drop in engine torque occurs (upon disengagement of the clutch), for instance with a time constant of $\tau=20$ ms. While in the gear changing phase a time constant of $\tau=200$ ms is adequate; the same is true for the phase of clutch engagement. Here the engine torque is regulated "slowly", and the engine rpm adapts itself to the new gear ratio.

The second decision circuit 28 of FIG. 1, at time $t_0$, takes on the task of guiding the engine torque, if there is a drive train controller as shown in the drawing. Conversely, if the guidance of the engine torque is located outside the shifting event, that is, outside a shifting event of the transmission, of the engine controller, then the signal on channel K3 drops back to zero after the shifting-event-dictated intervention. This signals a "handing back" of priority, which can also be done via some other discrete value. This can be done in a planetary gearing system in the same way as in an ASG, but in the case of a planetary gearing system the phases (2) and (3) represented in the drawing must in principle proceed simultaneously.

On downshifting with an interruption of traction force, an increase in the engine torque may be necessary into order to adapt the engine rpm to the new gear or the near gear ratio. This is true for all geared transmissions, not only for ASG. This is explained by equation (I). FIG. 5 shows an example of this. Once again, an ASG is assumed. In principle, the same phases (1) to (3) as shown in FIG. 4 pertain. During the phase of traction force interruption, the engine torque is reduced sharply (see the control signals on channel K3). If $M_{mot}$ without intervention is equal to 80 Nm, then a reduction to 20 Nm follows. However, in the present case of downshifting, to speed up the process of adaptation of the engine rpm to a higher level—synchronization phase (2a)— the desired engine torque is increased to 40 Nm, by a signal or datum on channel K3. This speeds up the synchronization to the new target gear. Under some circumstances, the transmission construction can be simplified (i.e. synchronizing rings can be omitted).

To assure a fast response of the engine to a demand on the part of the ETC for a torque increase, the demand is imparted "in preparatory fashion" to the EEC. A "fast" reducing intervention (for instance via the ignition angle) can then first be combined with a torque-increasing intervention, and the two interventions initially cancel one another out. Not until when the fast increase in engine torque has to occur is the quickly effective reducing engine intervention cancelled. This, too, can readily be achieved with the described interface.

However, additions are necessary to accomplish this. This can be done in such a way that via a further information channel K2, an intervention is indicated "in preparatory fashion" by a status signal "1". While on channels K1 and K3 the intervention is specified or dimensioned by the transmission controller 3. As soon as the transmission controller 3 outputs a signal on K2, the change in the time constant is announced.

FIG. 5 shows an example in which the transmission controller controls the engine torque both after and before the shifting event. Not until a time t3 is this type of intervention ended. It will be described in further detail hereinafter.

In phase (3), the engine torque is regulated to the target value outside the shifting event, at time t2 and in parallel the clutch is closed at time t2.

In a planetary gearing system, phases (2) and (3) are often inseparably connected to one another on principle. Conversely, in an ASG, the gear change takes place by the claw or ratchet principle in phases (2), (2a). Phase (3) then serves to adapt the engine rpm to the new gear ratio. Phase (3) is relevant to comfort; to that end it is important for the clutch to slip (in metered fashion).

Phase (4) serves to make the course of the power takeoff torque more continuous, for the sake of comfort. It is a fact of the mechanical construction of automatic/manual-shift transmissions ASG that upon shifting, a complete interruption of traction force occurs (this is also partly true for planetary gearing systems). The traction force interruption is all the more apparent to the driver on downshifting due to the power takeoff moment in the lower gear being increased by the new gear ratio. On the condition that the driver demand $N_{mot,soll,fahrer}$ remains significantly positive, this is then corrected at times t2 through t3:

$$M_{mot,soll}(t)=M_{mot,soll,fahrer}(t)+M_{kor}(t) \tag{II}$$

The correction term has a positive sign, for reasons of general validity, but it is subtracted in downshifting.

Phase (4) will also be described in further detail hereinafter.

FIG. 6 shows the engine rpm $N_{mot}$ and the control signals in a so-called CVT (continuously variable transmission). In such a transmission, the effect occurs that because of a fast, major change in the gear ratio resulting from what in this case is a requisite relatively major amount of adjusting energy, additional torque is needed (for the hydraulic adjusting system of the cone pulleys). To avoid a drop in the transmission output moment in the process (which is particularly problematic when acceleration is demanded), the brief additional torque needed is compensated for by a corresponding demand on the part of the transmission controller.

From FIG. 6, the course over time can be seen. At time t0, a signal on the channel K2 is set to the value "1", in order to prepare for a rapid (τ=20 ms) engine intervention that increases the engine torque. In the process, in a gasoline engine, for instance, the ignition is set to a torque-reducing value but at the same time the throttle valve is opened. The information on channel K3 is used to dimension the engine intervention. The torque-increasing intervention is tripped by the change on channel K3 from time t1 on, specifically by outputting a signal "+40 Nm". On channel K2, the incipient "fast" torque demand is announced.

Thus far, only events during a gear change and the effects on the interface 4 between the engine controller 2 and transmission controller 3 have been described herein. The influence on the engine by the transmission controller 3 outside a gear change will now be addressed as well. After the gear change upon upshifting, a transmission brings about a reduction in the transmission output moment and thus in the final analysis of the wheel moment:

$$dM_{ab}=M_{mot,ist}(t_0)*i_0-M_{mot,ist}(t_2)*i_1 \tag{III}$$

in which i is the gear ratio of the transmission.

The influence of a torque converter is not taken into account in this equation.

Figure 8:
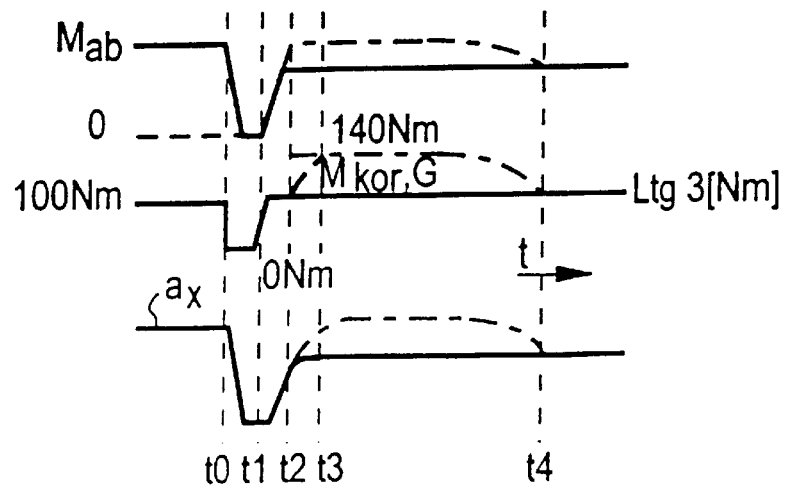
FIG. 8 is a graph of the course over time of operating variables of the motor vehicle, and a further control signal transmitted in the drive train controller.

In this connection, see the solid line in FIG. 8. The behavior, in a conventional drive train controller, makes a motor vehicle less controllable, because it reduces acceleration. In addition, attention must be paid to this factor in determining the shifting points. As a consequence, the adaptation of the shifting points is placed in operating regions of the engine that bring about lower efficiency and hence higher fuel consumption. The reason for this is to avoid a need on the part of the driver, after upshifting, to compensate for the loss in wheel moment by decreasing the throttle valve opening, as would be the case if the shifting points were to be determined strictly on principles of efficiency. This type of intervention, from the standpoint of the driver, would be considered fairly uncomfortable.

Another situation is when driving on a slope. Here the loss of drive torque after upshifting makes itself felt in a particularly irritating way, possibly resulting in gear hunting.

A solution to this contradiction between efficiency and comfort is on the one hand to determine the shifting points strictly by criteria of the best possible engine efficiency, and on the other influence on the engine to avoid driver interventions.

One known principle for solving the problem is to interpret the accelerator (gas) pedal as the desired engine torque, which to some extent is done by controllers current on the market and by their behavior, but with the substantial additional characteristic that the engine torque, for a certain time after shifting as well, is secondary to the demand for constant wheel moment. Certain criteria for this are the vehicle acceleration, the slope of the road, and the driving style of the driver.

Figure 7:
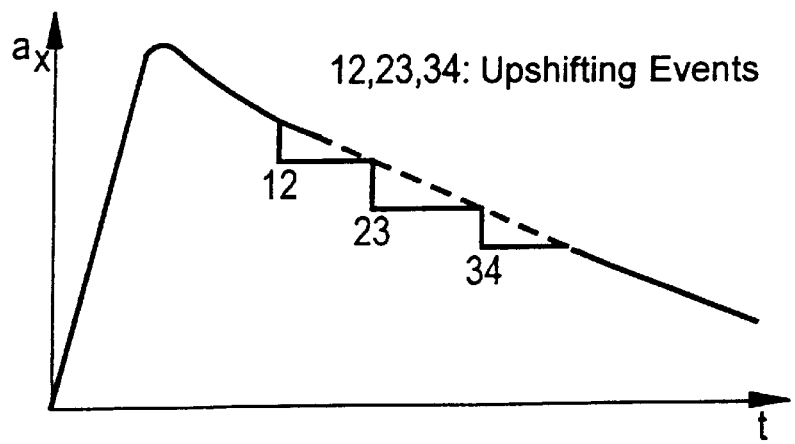
FIG. 7 is a graph of the course over time of a motor vehicle acceleration upon a plurality of upshifting events of a transmission.

In FIG. 7 the acceleration $a_x$ of the motor vehicle in the longitudinal direction during accelerated driving with multiple upshifting events is plotted over time. FIG. 7 clearly shows in principle the disadvantages of a conventionally control system without an engine intervention after shifting (solid line).

Upon each upshifting event the transmission output moment is reduced (starting from a vehicle at a stop). The acceleration $a_x$ undergoes a drop after each upshifting event, which can be adjusted to the ideal line (steady course shown in dotted lines) only by a compensating intervention by the driver. If a steady course of longitudinal acceleration $a_x$ is considered to be the ideal behavior, then after the shifting event the drive train controller must increase the engine torque, so as to reproduce the wheel torque as in the "old" gear.

It can also be seen from FIG. 7 that the vehicle acceleration drops even if the power takeoff moment is constant. This is because the vehicle wind resistance increases with increasing speed. In FIG. 7, a type of transmission without traction force interruption is assumed (planetary gearing system).

The steady course of acceleration shown in dashed lines is attained with the drive train controller of FIG. 1. In the transmission controller 3, the shifting point determiner 16 decides whether the transmission is at a change of gear ratio stage or not, and it accordingly controls the engine intervention with the switch S.

At a change of gear ratio or gear, an intervention to the engine controller 2 is made via the interface 4 as explained above. The first decision circuit 27 calculates the influence on the engine outside the shifting event. Both decision circuits also receive the variables $M_{mot,ist}$, $M_{mot,max}$ and $M_{mot,min}$ (this is not shown in FIG. 1). Once a gear change has been concluded (in FIGS. 4 and 6 this is at t>t2), in ASG and planetary gearing systems the engine moment is increased such that the power take-off moment meets the equation that can be read from FIG. 8:

$$M_{ab}(t_0)=M_{ab}(t_3) \quad (IV)$$

FIG. 8 shows a course of the power takeoff torque similar to that of FIG. 4 (with a solid line, for a conventional system). The dotted line shows the intervention with the target of achieving the same acceleration $a_x$ after shifting as before shifting. This is done by an intervention that increases the engine torque after time t1 on the channel K3. The positive amount $M_{kor}$ on this line is adapted in the process to the current driving situation. Thus at high acceleration or in a sporty driving style, the positive value $M_{kor}$ tends to be higher than in the nonaccelerated situation.

$$M_{mot,soll}(t)=M_{mot,soll,fahrer}(t)+M_{kor} \quad (V)$$

To increase engine efficiency, it is appropriate to perform shifting early in the lower load rage, at relatively low vehicle speeds. By increasing the engine torque after shifting, which is done by the transmission controller 3 using $M_{kor}$, the engine is put in a more-efficient operating range.

Time t3 in FIG. 8 can be selected freely. In the ASG, this point will be set markedly later than t2 (t3>>t2), so that the interruption in traction force will be even less perceptible.

Time t4 should also be freely selectable (the increasing intervention has faded).

In a planetary gearing system, t2 can immediately follow the end of a shift. If the shifting quality allows this (on account of a load change), t2 can even occur during the shifting. The following calculation is intended to determine the maximum amount of $M_{kor}$ (t3).

$$M_{mot,soll,fahrer}(t_3)=M_{mot,soll,fahrer}(t_0) \quad (VI)$$

Only under this condition does equation (IV) apply, in order to avoid a behavior of the vehicle that is implausible to the driver.

It follows from equation (IV) (no distinction between the desired and the actual values) that $$i_1 * M_{mot}(t_0)=i_2 * M_{mot}(t_3)$$

and from this it follows that $$M_{mot}(t_3)=i_1/i_2 * M_{mot}(t_0) \quad (VII)$$

Inserting equation (VII) into equation (V), assuming:

$$M_{mot}(t_3)=M_{mot,soll}(t_3)$$

The precondition is that by the engine torque model of FIG. 3, the requested torque $M_{mot,soll}$ can be reproduced.

It is also a condition in equation (VI) that $M_{kor}$ ($t_0$)=0.

$$M_{kor}(t_3)=M_{mot,soll,fahrer}(t_3)*i_1/i_2-M_{mot,soll,fahrer}(t_3)$$

$$M_{kor}(t_3)=M_{mot,soll,fahrer}(t_3)*(i_1/i_2-1) \quad (VIII)$$

The expression describes the maximum intervention after the end of shifting or after the end of the shifting-event-dictated engine intervention. For downshifting in accordance with FIG. 5, the same expression applies after time t2. In this case, $M_{kor}$ ($t_2$) assumes a negative value (see also equation (II)).

In general for upshifting it can be stated that $$M_{kor}(t) \leq M_{mot,soll,fahrer}(t)*(i_1/i_2-1)*k(t)$$

with ($t_4 \geq t \geq t_2$) as in FIG. 8.

For downshifting:

$$M_{kor}(t) \geq M_{mot,soll,fahrer}(t)*(i_1/i_2-1)*k(t)$$

where ($t_3 \geq t \geq t_2$) according to FIG. 5.

Here k(t) is an arbitrary function, which causes the engine intervention to become more pronounced or to fade outside shifting events. Moreover, k(t) is generally independent of operating parameters and of such variables characterizing the driving status as the vehicle speed, vehicle acceleration, slope of the roadway, driving style, driving strategy, and type of shifting. Examples of this are listed below.

If the driving mode is oriented toward performance, then the maximum value for k(t) will be greater; that is, $M_{ab}$ will be markedly raised after upshifting. This is also useful in an intensive acceleration process (see also FIG. 7).

If the vehicle is driving uphill, then the maximum value for k(t) will also be greater; that is, $M_{ab}$ will be markedly raised after upshifting. This prevents so-called "gear hunting". Gear hunting happens if after upshifting the vehicle hesitates and the driver accordingly presses harder on the accelerator pedal, followed by downshifting with the driver pulling back again on the accelerator pedal, followed by upshifting, and so forth.

If the transmission controller detects a calm driving style, then k(t) ranges from very low to zero; that is, no corrective intervention takes place upon upshifting. This is again advantageous for shifting comfort (especially in the ASG), if as in the case of FIG. 8 a traction force interruption is involved. In that case, the interruption is not very markedly perceptible. The same is true for unaccelerated driving (not driving uphill).

If the engine is driven near the full-load line, that is, if it is not possible to increase the engine torque (indicated via $M_{mot,max}$), then the correction term k(t) must be adapted to this or limited.

In downshifting events, behavior as shown in FIG. 5 is in principle appropriate; that is, at time t2, k(t) will initially assume a high value (approximately 1), or a value such that no discontinuous course of the signal $M_{kor}$ on the channel K3 occurs (avoidance of an abrupt change in torque). At time t3, let k(t)=0; that is, $M_{mot,soll}$ is again equivalent to the signal $M_{mot,soll,fahrer}$. Depending on the driving style, t3 can be defined: for a calm driving style, t3 is set later (emphasis on comfort); for a sporty driving style, conversely, $M_{mot,soll}$ is very rapidly increased to the final value $M_{mot,soll,fahrer}$ (for example upon downshifting for passing), in order to assure the requisite driving performance.

Times t2, t3, t4 (of upshifting or downshifting) are calculated by function block 27 (FIG. 2). Torque's losses from such torque reducers as an air conditioner compressor, generator, hydraulic pumps (of the transmission and power steering) are compensated for, in order to assure uniform behavior of the drive train as perceived by the driver.

It is also useful for the interventions in $M_{mot,soll}$ to be monitored in alternation by the engine controller 2 and the transmission controller 3, for instance by redundant algorithms, in order to avoid unintended acceleration of the motor vehicle.

I claim:

1. A drive train controller of a motor vehicle having an engine and an automatic transmission, the drive train controller comprising:

an engine controller for controlling variables affecting engine torque;

a transmission controller for controlling shifting events of an automatic transmission;

an interface interconnecting said transmission controller and said engine controller for allowing continuous communications between said transmission controller and said engine controller;

said transmission controller transmitting a correction term $M_{kor}$ to said engine controller over said interface for controlling a magnitude of the engine torque; and said transmission controller transmitting a time constant to said engine controller via said interface for controlling dynamic behavior of the engine torque.

2. The drive train controller according to claim 1, wherein said time constant transmitted by said transmission controller defines the engine torque outside a shifting event.

3. The drive train controller according to claim 1, wherein said correction term $M_{kor}$ transmitted by said transmission controller increases the engine torque after shifting as a function of a driving situation wherein a power takeoff torque of the transmission after shifting is approximately equal to a power takeoff torque before shifting.

4. The drive train controller according to claim 1, wherein said interface interconnecting said engine controller and said transmission controller has a first channel for transmitting data specifying a type of engine intervention, and a second channel for transmitting data dimensioning an amplitude of the engine intervention.

5. The drive train controller according to claim 1, wherein said interface interconnecting said engine controller and said transmission controller has a first channel for transmitting data parameterizing an engine intervention of a predetermined type, and a second channel transmitting data dimensioning an amplitude of the engine intervention.

6. The drive train controller according to claim 5, wherein said interface interconnecting said engine controller and said transmission controller has a third channel for transmitting data activating the engine intervention in a preparatory fashion.

* * * * *